United States Patent [19]

Chang et al.

[11] Patent Number: 4,725,113
[45] Date of Patent: Feb. 16, 1988

[54] FORM BIREFRINGENT CUTOFF POLARIZER AND METHOD

[75] Inventors: Chin-Lung Chang, Phoenix, Ariz.; John R. Feth, Chatsworth, Calif.

[73] Assignee: Litton Systems, Inc., Beverly Hills, Calif.

[21] Appl. No.: 768,540

[22] Filed: Aug. 22, 1985

[51] Int. Cl.⁴ ............................................. G02B 5/30
[52] U.S. Cl. ........................... 350/96.15; 350/96.29; 350/395; 350/406
[58] Field of Search ............. 350/96.15, 96.16, 96.29, 350/96.30, 394, 395, 400, 406, 320

[56] References Cited

U.S. PATENT DOCUMENTS

| | | | |
|---|---|---|---|
| 3,625,589 | 12/1971 | Snitzer | 350/96 |
| 3,645,603 | 2/1972 | Smith | 350/149 |
| 4,089,582 | 5/1978 | Mahlien et al. | 350/96.13 |
| 4,139,262 | 2/1979 | Mahlien et al. | 350/96.33 |
| 4,268,116 | 5/1981 | Schmadel et al. | 350/96.29 |
| 4,386,822 | 6/1983 | Bergh | 350/96.15 |
| 4,389,090 | 6/1983 | Lefevre | 350/96.29 |
| 4,410,275 | 10/1983 | Shaw et al. | 356/350 |
| 4,431,260 | 2/1984 | Palmer | 350/96.15 |
| 4,456,377 | 6/1984 | Shaw et al. | 356/350 |
| 4,461,574 | 7/1984 | Shaw et al. | 356/350 |
| 4,515,441 | 5/1985 | Wentz | 350/395 |
| 4,529,312 | 7/1985 | Pavlath et al. | 356/350 |
| 4,583,818 | 4/1986 | Chen et al. | 350/96.19 |
| 4,589,728 | 5/1986 | Dyott et al. | 350/96.30 |
| 4,666,235 | 5/1987 | Pavlath | 350/96.15 |

FOREIGN PATENT DOCUMENTS 3305104 8/1984 Fed. Rep. of Germany.
WO84/02006 5/1984 PCT Int'l Appl. ............... 350/96.15

OTHER PUBLICATIONS

Eickhoff, W., "In-Line Fiber-Optic Polariser", Electronics Letters, vol. 16, No. 20, 25 Sep. 1980, pp. 762-764.
Hosaka et al., "Fabrication of Single-Mode Fiber-Type Polarizer", Optics Letters, vol. 8, No. 2, Feb. 1983, pp. 124-126.
Hosaka et al., "Single-Mode Fiber-Type Polarizer", IEEE J. of Q. Elect., vol. QE-18, No. 10, Oct. 1982, pp. 1569-1572.
Mohr, F. A. & Scholz, U., "Polarization Control for an Optical Fiber Gyroscope", Fiber Optic Rotation and Related Technology, Springer Verlag, 1982, pp. 163-168.
Ulrich, R., "Polarization Stabilization on Single-Mode Fiber", Appl. Phys. Lett., 35(11), 12/01/79, pp. 840-842.
Kintner, E. C., "Polarization Problems in Optical Fiber Gyroscopes", Applied Optics, pp. 78-81.
Lefevre et al., "Progress in Optical Fiber Gyroscopes Using Integrated Optics", 12 pages.
Johnson, M., "In-Line Fiber-Optical Polarization Transformer", Appl. Optics, vol. 18, No. 9, 1 May 1979, pp. 1288-1289.
Pavlath et al., Fiber Optics Gyroscopes: Advances and Future Developments, Navigation; Journal of the Institute of Navigation, vol. 31, No. 2, Summer 1984, pp. 70-83.
Alekseev et al., "Polarization Modulation of the Radiation in a Single-Mode Fiber Lightguide", Pis'Ma Zh. Tekh. Fiz. 5, July 26, 1979, pp. 887-890.
Flanders, D. C., "Submicrometer Periodicity Gratings as Artificial Anisotropic Dielectrics", Appl. Phys. Lett., 42(6), 15 Mar. 1983, p. 492.

Primary Examiner—John Lee
Attorney, Agent, or Firm—John H. Lynn

[57] ABSTRACT

The cladding and a portion of the core of a length of optical fiber are removed to form an interaction region. A form birefringent stack is positioned on the exposed core. The refractive index of the stack for polarizations parallel to the plane of the interaction region is approximately equal to the refractive index of the fiber core so that these polarizations radiate from the fiber. The refractive index of the stack for the polarization normal to the plane fo the interaction region is approximately equal to the refractive index of the cladding so that this polarization remains guided by the fiber. A photodetector forms an error signal from the polarization radiated from the fiber, and control circuitry processes the error signal to drive a polarization controller that adjusts the polarization of light input to the polarizer to minimize the error signal.

38 Claims, 7 Drawing Figures

FORM BIREFRINGENT CUTOFF POLARIZER AND METHOD

BACKGROUND OF THE INVENTION

This invention relates generally to apparatus and methods for polarizing light and particularly to apparatus and methods for polarizing light that is propagating in an optical fiber. Still more particularly, this invention relates to a form birefringent fiber optic polarizer and methods of fabrication and use thereof.

A polarizer is a device that removes selected polarization components from a light wave. Some familiarity with propagation and polarization of light within an optical fiber will facilitate an understanding of both the present invention and the prior art. Therefore, a brief discussion of fiber optic waveguides, normal modes of propagation of light in such waveguides and polarization of light is presented.

It is well-known that a light wave may be represented by a time-varying electromagnetic field comprising orthogonal electric and magnetic field vectors having a frequency equal to the frequency of the light wave. Any electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate without severe attenuation. The waves having field components that propagate unattenuated are the normal modes.

In describing the normal modes, it is convenient to refer to the direction of the electric and magnetic fields relative to the direction of propagation of the wave. If only the electric field vector is perpendicular to the direction of propagation, which is usually called the optic axis, then the wave is said to be a transverse electric (TE) mode. If only the magnetic field vector is perpendicular to to the optic axis, the wave is a transverse magnetic (TM) mode. If both the electric and magnetic field vectors are perpendicular to the optic axis, then the wave is a transverse electromagnetic (TEM) mode. None of the normal modes require a definite direction of the field components; and in a TE mode, for example, the electric field may be in any direction that is perpendicular to the optic axis.

The direction of the electric field vector in an electromagnetic wave is the polarization of the wave. In general, a wave will have random polarization in which there is a uniform distribution of electric field vectors pointing in all directions permissible for each mode. If all the electric field vectors in a wave point in only one particular direction, the wave is linearly polarized. If the electric field consists of two orthogonal electric field components of equal magnitude and 90° out of phase, the electric field is circularly polarized because the net electric field is then a vector that rotates around the optic axis at an angular velocity equal to the frequency of the wave. If the two linear polarizations have unequal magnitudes and phases that are neither equal nor opposite, the wave has elliptical polarization. In general, any arbitary polarization can be represented by either the sum of two orthogonal linear polarizations, two oppositely directed circular polarizations or two oppositely directed elliptical polarizations having orthogonal semi-major axes.

The velocity of an optical signal depends upon the index of refraction of the medium through which the light propagates. Certain materials have different refractive indices for different polarizations. A material that has two refractive indices is said to be birefringent. The polarization of the signal propagating along a single mode optical fiber is sometimes referred to as a mode. A standard single mode optical fiber may be regarded as a two mode fiber because it will propagate two waves of the same frequency and spatial distribution that have two different polarizations. Two different polarization components of the same normal mode can propagate through a birefringent material unchanged except for a difference in velocity of the two polarizations.

The amount of birefringence is used herein to mean the difference between the two refractive indices of a medium that guides a light wave. Controlling the amount of birefringence permits the control of the polarization of a light signal output from a length of fiber optic material. If the wave propagated by a fiber comprises two linear polarization components, increasing or decreasing the difference between the refractive indices of the fiber provides means for controlling the optical length of the fiber for each of the two polarizations. If the fiber is birefringent, then the two polarization components will be shifted in phase as they propagate along the fiber. Since the velocity of light in an optical fiber is $v=c/n$, where c is the free space velocity of light and n is the refractive index of the fiber, the polarization component having the lower refractive index will have a smaller transit time in the fiber than will the component having the higher refractive index. Many fiber optic systems have operational characteristics that are highly dependent upon the polarization of the light guided by the optical fiber. Such systens include optical gyroscopes and interferometric sensors. In order to obtain measurements of the desired accuracy, it is essential that the light have only a single polarization because only light waves of the same polarization produce the desired interference patterns.

Optical wave behavior in layers of two materials having different refractive indices optically and periodically stratified differs from that in a uniform medium. If the thickness of each layer is sufficiently small compared with the light wavelength and the number of layers is sufficiently large, the compound medium is birefringent. Form birefringence occurs in an ordered arrangement of layers of optically isotropic materials having dimensions large compared with the molecules of the materials, but small when compared with the optical wavelength propagating in the fiber.

Differential attenuation metal clad fiber optical polarizers based on the difference of approximately two orders of magnitude between the attenuation coefficients between the TE and TM modes have been described in the prior art. Such polarizers employ a relatively thick metal coating over a portion of the core of an optical fiber from which the cladding has been removed. As the waves impinges upon the portion of the cladding having the metallic coating, the distribution of electromagnetic fields changes so that one linear polarization is attenuated much more strongly than the other linear polarization.

Electric field components parallel to the metal coating cause ohmic heat in the metal and are rapidly attenuated. Electric field components parallel to the metal coating are attenuated only about 1% as strongly as the perpendicular electric fields. The prior art metal clad polarizers require a long interaction length in order to achieve a high extinction ratio. However, in order to obtain a high extinction ratio, these differential attenuation polarizers incur a high insertion loss. The extinction ratio of a polarizer is the measure of its efficacy in reducing the intensity of an undesired polarization relative to that of a desired polarization. The insertion loss is the ratio of the power of the desired polarization lost by transiting the polarizer relative to the initial power in the desired polarization. Even with a relatively long interaction length, polarizers based on differential attenuation give extinction ratios of about 24 dB when the insertion loss is restricted to an acceptable amount.

Since differential attenuation polarizers convert the energy in the undesired polarization into heat, the intensity of the wave having the undesired polarization cannot be monitored using a photodetector. Therefore, the differential attenuation polarizer is unsuitable for use with a polarization controller and a feedback system to provide optimum intensity of the desired polarization.

Previous fiber optic polarizers include the crystal polarizer disclosed in U.S. Pat. No. 4,386,822. A length of fiber optic material from which a portion of the cladding has been removed to form an interaction region is placed adjacent a birefringent crystal. The birefringent crystal is chosen such that it has a first index of refraction greater than or equal to that of the fiber core for the undesired polarization and a second index of refraction equal to or slightly less than that of the fiber cladding for the polarization that is desired to be propagated in the fiber. An exponentially decaying portion of the field guided by the fiber extends beyond the core boundary into the cladding. This decaying portion of the field is called the "evanescent field". The evanescent field of light guided by the fiber interacts with the birefringent crystal, and light of an undesired polarization couples to the birefringent medium and does not propagate in the fiber past the interaction region. Light of the desired polarization is unaffected by the birefringent crystal and is guided by the fiber.

Although the crystal polarizer is capable of providing the desired extinction ratios with low insertion loss, the operational characteristics of such polarizers are temperature dependent. The temperature dependence of such devices arises primarily from the temperature dependence of the refractive indices of the crystal. If the second refractive index of the crystal changes with temperature to exceed the refractive index of the cladding, then the crystal device ceases to function as a polarizer. If the refractive index of the crystal becomes appreciably less than that of the cladding, then some of the undesired polarization will be reflected at the crystal-fiber interface and will thus remain in the fiber rather than coupling into the crystal. A fiber optic gyroscope requires a polarizer with an extinction ratio greater than 100 dB. A crystal polarizer set to provide an extinction ratio of 100 dB at 24° C. may have an extinction ratio of only 24 to 30 dB if the temperature increases to 30° C.

Form birefringent polarizers using evanescent field coupling to form a bulk wave from the undesired polarization are known in the art. Evanescent field form birefringent polarizers require precise index matching of the core and cladding refractive indices. Such precise control of the refractive indices is difficult to achieve.

SUMMARY OF THE INVENTION

The present invention provides a polarizer that yields an improve extinction ratio for the indesired polarization and an improved insertion loss for the desired polarization. A polarizer according to the invention produces a high extinction ratio with much smaller insertion loss than the prior art differential attenuation optic polarizers without having the temperature dependence of evanescent field polarizers.

The apparatus of the invention includes a length of optical fiber from which a portion of the cladding has been removed to form an interaction region. The fiber is preferably curved at the interaction region so that the fiber thickness increases gradually away from the center of the interaction region along the length of the fiber. Sufficient material is removed from the fiber at the interaction region to form a planar exposed portion of the fiber core. A planar cladding portion surrounds the exposed core portion. A form birefringent stack is placed on the planar core and cladding portions.

The form birefringent stack is formed such that the refractive index for polarizations parallel to the polished portion of the fiber is approximately equal to the refractive index of the core. The refractive index of the form birefringent stack for the polarization normal to the polished portion of the fiber is approximately equal to the refractive index of the cladding.

The fiber and the form birefringent stack present an asymmetric refractive index distribution to light having an electric vector parallel to the polished surface of the fiber. The core appears to be very large to these polarizations, which therefore escape from the fiber at the interaction region. Rather than propagating within the fiber, electric field components parallel to the layers of the form birefringent stack radiate from the fiber through the stack and escape from the fiber.

Since the refractive index of the form birefringent stack is nearly equal to the cladding index for the polarization component normal to the polished surface, this polarization remains guided by the core.

A photodetector may be employed to form an error signal from the light that is radiated from the fiber. Control circuitry processes the error signal to drive a polarization controller that adjusts the polarization of light input to the cutoff polarizer to minimize the error signal.

The method of forming the polarizer of the invention involves forming a coupler half, which peferably comprises a length of optical fiber mounted within a curved groove in a suitable substrate. The substrate may advantageously be formed from a block of fused quartz. The curved groove is formed by well known optical grinding techniques. The fiber may be retained within the groove by a suitable adhesive, and then the surface of the substrate adjacent the convexly curved portion of the fiber is ground and polished to form an optically flat surface. The grinding and polishing removes all of the cladding at the interaction region and a portion of the fiber core at the interaction region.

The form birefringent stack is preferably formed on the polished portion of the fiber by depositing alternating layers of material having differing refractive indices. The refractive indices of the composite form birefringent structure depend upon the thicknesses and refractive indices of the layers.

The form birefringent stack may be formed as a separate component and then placed adjacent the polished portion of the fiber. An index matching oil may be included between the form birefringent stack and the fiber.

DESCRIPTION OF THE PREFERRED EMBODIMENT

Structural Components of the Polarizer

Figure 1:
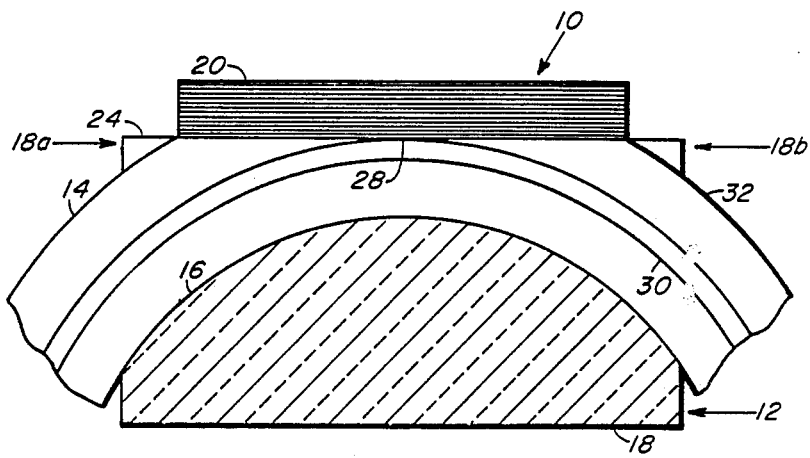
FIG. 1 is a side cross sectional view of a fiber optic polarizer according to the invention showing a form birefringent stack adjacent an optical fiber mounted in a curved groove in a substrate.
Figure 2:
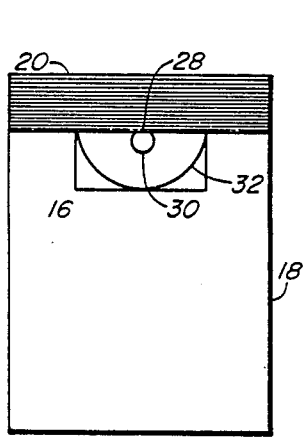
FIG. 2 is an end cross sectional view of the fiber optic polarizer of FIG. 1.

Referring to FIGS. 1 and 2, a form birefringent polarizer 10 according to the invention includes a coupler half 12 that includes an optical fiber 14 mounted in a curved groove 16 in a substrate 18. A form birefringent stack 20 is positioned adjacent a generally planar interaction region 28 in optical fiber 14.

Figure 5:
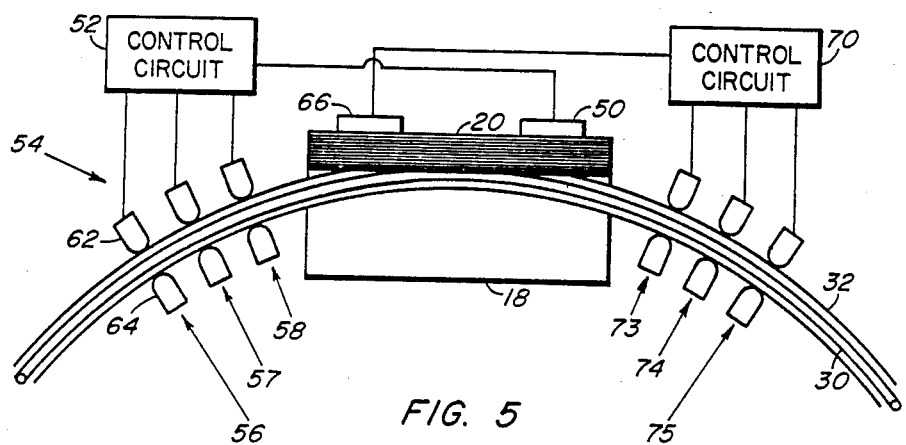
FIG. 5 is a schematic representation of a feedback control system for controlling the polarization of light input to the polarizer of FIG. 1.

Referring to FIGS. 1, 2 and 5, light polarized parallel to the plane of interaction region 28 radiates from fiber 14. Light polarizer perpendicular to the plane of interaction region 28 propagates in fiber 14 beyond interaction region 28 to form the output signal of polarizer 10.

Referring to FIG. 5, if light is incident from the left, the radiated energy of the parallel polarization component of the wave travels through form birefringent stack 20. A portion of the radiated energy impinges upon a photodetector 50 that outputs an electric current in response to the optical intensity incident thereon. An electronic control circuit 52 processes the photodetector output and provides control signals to a fiber optic polarization controller system 54, which adjusts the polarization input to the polarizer 10 to minimize the control signal. The optical throughput of polarizer 10, therefore, has essentially a single predetermined polarization.

Polarization control system 54 preferably includes a plurality of fiber squeezers 56-58 connected to the control circuit 52. Fiber squeezers 56-58 are preferably identical in structure. Fiber squeezer 56, for example, comprises a pair of piezoelectric actuators 62, 64 that respond to voltages from control circuit 52 to change the compressive force on fiber 14 from a preload. The fiber squeezers 56 and 58 preferably are aligned so that the stresses produced thereby are alighed to be parallel to each other and perpendicular to fiber 14. Fiber squeezer 57 is disposed between fiber squeezers 56 and 58. Fiber squeezer 57 applies a stress that is perpendicular to fiber 14 and that is also at an angle of 45 degress to the stresses produced by the fiber squeezers 56 and 58.

Optical fiber 14 is a birefringent medium, which means that the index of refraction is polarization dependent. The amount of birefringence is used herein to mean the difference between the two refractive indices of a medium that guides a light wave. Controlling the amount of birefringence permits the control of the polarization of a light signal output from a length of fiber optic material. If the wave propagated by filter 14 comprises two linear polarization components, increasing or decreasing the difference between the refractive indices provides means for controlling the optical path length of fiber 14 for each of the two polarizations. If fiber 14 is birefrigent, then the two polarization components will be shifted in phase as they propagate along the fiber. Since the velocity of light in an optical fiber is $v = c/n$, where c is the free space velocity of light and n is the refractive index, the polarization component having the lower refractive index will have a greater velocity and, therefore, a smaller transit time in the fiber than the component having the higher refractive index. Controlling the refractive indices of fiber 14, therefore, controls the polarization of light input to polarizer 10.

It is well known that application of a compressive force to a length of optical fiber 14 along an axis transverse thereto changes the refractive indices by means of the photoelastic effect, resulting in stress-induced birefringence. In general, three fiber squeezers are required to convert an arbitrary polarization into a predetermined polarization for input to polarizer 10. If there is no appreciable birefringence in the length of fiber 14 between adjacent fiber squeezers 56-58, then only two fiber squeezers are required to control the polarization of the light input to polarizer 10.

Polarizer 10 is capable of providing an output light having a predetermined polarization in counterpropagating waves in fiber 14. If light of mixed polarization impinges upon polarizer 10 from the right, then the undesired polarization is radiated from fiber 14 when the desired polarization remains therein. A second photodetector 66 produces an electrical signal indicative of the intensity of the radiated polarization. A second control circuit 70 processes the output of photodetector 66 and provides control signals to a plurality of fiber squeezers 73-75, which are essentially identical to fiber squeezers 56-58 described above. The polarizer 10 generates error signals from two counterpropagating waves at the same region of fiber 14 so that all optical signals emanating from polarizer 10 have the same polarization.

The Coupler Half

Figure 3:
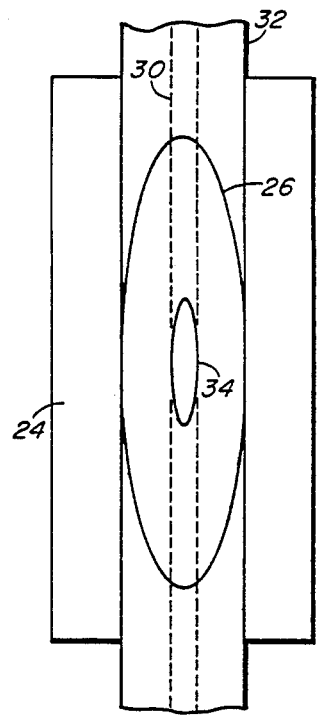
FIG. 3 is a plan view of a coupler half included in the fiber optic polarizer of FIGS. 1 and 2 showing planar surfaces in the core and cladding of an optical fiber included in the coupler half.

Referring to FIGS. 1-3, curved groove 16 is formed in an optically flat surface 24 of substrate 18. Curved groove 16 has a radius of curvature that is large compared to the diameter of fiber 14. FIG. 1 shows the radius of curvature of the fiber in exaggerated proportion relative to the fiber diameter for clarity of illustration of the interaction between light guided by fiber 14 and form birefringent stack 20. The width of groove 16 is slightly larger than the fiber diameter to permit fiber 14 to conform to the path defined by the bottom wall of groove 16. The depth of groove 16 varies from a minimum at the center of substrate 18, respectively, to a maximum at the edges thereof. The gradual curvature of fiber 14 prevents sharp bends or other abrupt changes in direction of fiber 14 to avoid power loss through more perturbation.

Groove 16 may be rectangular in cross section as shown in FIG. 2; however, it is to be understood that other cross sectional configurations such as U-shaped or V-shaped may be used in forming coupler half 12. At the center of substrate 18 the depth of groove 16 is less than the diameter of fiber 14. At the edges 18a, 18b of substrate 18, the depth of groove 14 is preferably at least as great as the fiber diameter.

Fiber 14 has a central core 30 and a cladding 32. The refractive index of core 30 is greater than that of the cladding so that most of the light guided by the core intensity reflects at the core-cladding interface. Fiber optic material is removed from fiber 14 by any suitable method, such as lapping, to form an oval-shaped planar surface 26, shown in FIG. 3, in cladding 32. The surface 26 is coplanar with optically flat surface 24 of substrate 18. Sufficient cladding is removed to form an oval-shaped planar surface 34 in core 32. Planar surfaces 26 and 34 are concentric and have similar shapes that are approximately elliptical. Surfaces 26 and 34 are not precisely elliptical because they are not conic sections.

Surface 26 forms an interaction region 28 wherein light propagated by fiber 14 interacts with the form birefringent stack 20. The amount of fiber optic material removed increases gradually from zero near edges 18a, 18b of substrate 18 to a maximum amount at the center thereof. The tapered removal of fiber optic material causes fiber 14 to converge and diverge gradually relative to interaction region 28, which is advantageous for avoiding backward reflections and excessive loss of light energy at interaction region 28.

If fiber 14 is designed to propagate only a single mode of optical energy, core 30 normally has a circular cross section that is about 5 μm in diameter. Cladding 32 normally provides a refractive index distribution that is symmetrically disposed about core 30. If the refractive index of cladding 32 is symmetrical with respect to core 30, then almost all of the optical energy guided by fiber 14 is confined to core 30 if the core index is greater than the cladding index. However, if the fiber has an asymmetric refractive index distribution, core 30 has a cutoff diameter, d, such that if fiber 14 has a portion where the core diameter is less than the cutoff diameter, then the optical energy cannot be confined exclusively to core 30. The polarizer 10 uses this cutoff property to remove polarizations parallel to the interaction region 28 from fiber 14.

Figure 4:
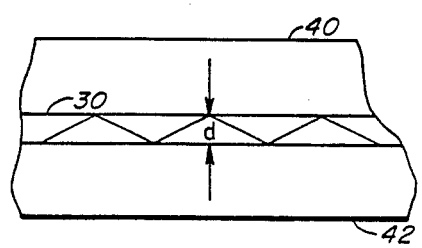
FIG. 4 is a side view of an optical waveguide between a superstrate and a substrate.

Referring to FIG. 4, the concepts of symmetry and asymmetry of the refractive indices are explained. Core 30 has a refractive index $n_g$. A superstrate 40 shown above core 30 has a refractive index $n_1$, and a substrate 42 shown below core 30 has a refractive index $n_2$. If $n_1 = n_2$, then the refractive indices are symmetrical with respect to the core 30; and energy will be essentially totally internally reflected as illustrated at the interfaces between core 30 and superstrate 40 and between core 30 and substrate 42. If $n_1 \neq n_2$, then the refractive indices are asymmetrical; and there is a cutoff diameter of core 30 as explained above.

Referring again to FIG. 1, if an optical signal of mixed polarization is incident upon polarizer 10 from the left, the asymmetry in refractive index at the interaction region causes polarization components parallel to the planar surface 26 to radiate from the fiber. According to the usual convention, the direction of propagation is the z-axis. Assuming a right-hand coordinate system, the x-axis points into the plane of FIG. 1, and the y-axis lies in the plane and is perpendicular to both the x- and z-axes. Since the refractive index of form birefringent stack 20 is essentially equal to that of the cladding for the polarization perpendicular to the interaction region, this polarization remains guided by the core by means of internal reflection. The polarization component perpendicular to the surface experiences a decrease in core cross sectional area, which increases the evanescent field portion of the guided wave.

Substrate 18 may be fabricated of any suitably rigid material. In a preferred embodiment, substrate 18 comprises a generally rectangular block of fused quartz glass approximately 1 inch long, 1 inch wide and 0.4 inch thick. Fiber 14 may be secured in curved groove 16 by a suitable cement (not shown) such as epoxy resin. The fused quartz substrate 18 advantageously has a coefficient of thermal expansion similar to that of fiber 14, which is important in maintaining structural integrity of substrate 18 and fiber 14 are subjected to any heat treatment during manufacture or use.

Form birefringent stack 20 may be formed directly on interaction region 28 of coupler half 12. Alternatively, form birefringent stack 20 may be formed as a separate component which is then placed adjacent interaction region 28. An index matching fluid may be inserted between form birefringent stack 20 and the fiber 14.

The Fore Birefringent Stack

Figure 6:
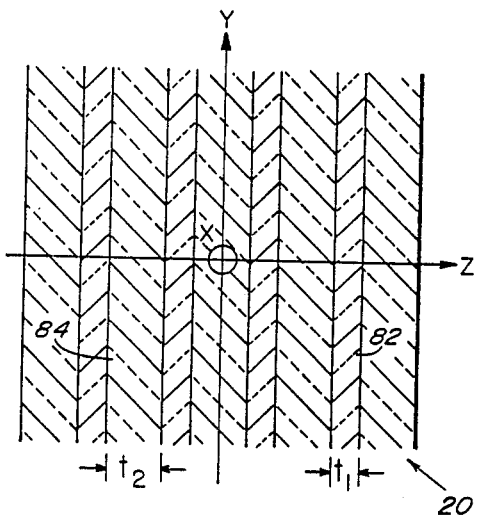
FIG. 6 is a cross sectional view illustrating characteristics of the form birefringent stack of FIGS. 1 and 2.

Referring to FIG. 6 a periodic multi-layer dielectric structure 20 comprises a plurality of alternating layers 82, 84 having different refractive indices. The thicknesses $t_1$ and $t_2$ of the layers 82, 84, respectively, are less than the wavelength of light to be propagated by the filter 14. In an optical rotation sensing system (not shown) the optical wavelength is typically about 820 nm.

The multilayer structure 20 has polarization-dependent refractive indices. For simplicity, it is assumed that a linearly polarized plane wave with its electric field in the z-direction propagates along the x-axis, which points out of the plane of FIG. 1. According to well known boundary conditions on electromagnetic waves at dielectric interfaces, the normal component of the electric displacement vector, D, must be continuous such that $$D_{1z} = D_{2z} = D; \tag{1}$$

and, therefore, $$\epsilon_1 E_1 = \epsilon_2 E_2 \tag{2}$$

where $\epsilon_1$ and $\epsilon_2$ are the dielectric constants of the two materials.

The average electric field over one period of the layered structure 10 is $$<E> = (t_1 D/\epsilon_1 + t_2 D/\epsilon_2)(t_1 + t_2)^{-1} \tag{3}$$

The effective dielectric constant $\epsilon_z$ for a wave polarized in the z-direction is therefore $$\epsilon_z = D/<E> \tag{4}$$

$$\epsilon_z = [(t_1+t_2)\epsilon_1\epsilon_2][\epsilon_2 t_1 + \epsilon_1 t_2]^{-1} \tag{5}$$

For convenience of notation, fractional thicknesses $f_1$ and $f_2$ are defined as:

$$f_1 = t_1/(t_1+t_2), \tag{6}$$

and $$f_2 = t_2/(t_1+t_2). \tag{7}$$

Using Equations (6) and (7) in Equation (5) gives $$\epsilon_z = (\epsilon_1\epsilon_2)(\epsilon_2 f_1 + \epsilon_1 f_2)^{-1}. \tag{8}$$

The tangential component of a wave polarized in the y-direction must be continuous so that $$E_{1y} = E_{2y} = E \tag{9}$$

The average value of the electric displacement over one period is $$<D> = (t_1\epsilon_1 E + t_2\epsilon_2 E)(t_1+t_2)^{-1} \tag{10}$$

From the definition of the electric displacement, $$\epsilon_y = <D>/E \tag{11}$$

which becomes $$\epsilon_y = (t_1\epsilon_1 + t_2\epsilon_2)(t_1+t_2)^{-1} \tag{12}$$

In terms of the fractional thicknesses $f_1$ and $f_2$, the dielectric constant $\epsilon_y$ for a wave polarized in the y-direction is given by $$\epsilon_y = \epsilon_1 f_1 + \epsilon_2 f_2 \tag{13}$$

Equations (8) and (13) may be used to calculate the refractive indices in the z- and y-directions. From the definition of the refractive index, $$n_z = [\epsilon_z/\epsilon_0]^{\frac{1}{2}}, \tag{14}$$

$$n_1 = [\epsilon_1/\epsilon_0]^{\frac{1}{2}}, \tag{15}$$

and $$n_2 = [\epsilon_2/\epsilon_0]^{\frac{1}{2}}, \tag{16}$$

where $\epsilon_0$ is the permittivity of free space.

Using Equations (14), (15) and (16) in Equations (8) and (13) gives $$n_z = (n_1 n_2)[n_2^2 f_1 + n_1^2 f_2]^{-\frac{1}{2}} \tag{17}$$

and $$n_y = [n_1^2 f_1 + n_2^2 f_2]^{\frac{1}{2}}. \tag{18}$$

A birefringent crystal has an ordinary index of refraction $n_o$ and an extraordinary index of refraction $n_e$. A wave polarized along the optic axis, which is, by convention, the z-axis, encounters the extraordinary refractive index $n_e$. If the extraordinary index is greater than the ordinary index, the birefringence is said to be positive; and if the extraordinary index is less than the ordinary index, the birefringence is negative. In the present case the nultilayer dielectric structure 10 has refractive indices $n_x$, $n_y$ and $n_z$ such that $$n_y = n_x > n_z, \tag{19}$$

which means that the ordinary index, $n_y$, is greater than the extraordinary index, $n_z$. Therefore, the multilayer dielectric structure 10 is analogous to a uniaxial crystal having a negative birefringence.

Equations (17) and (18) show that birefringent properties can be synthesized by properly choosing materials for the layers 82 and 84 to have particular refractive indices and by properly choosing the fractional thicknesses $f_1$ and $f_2$. The birefringence of the layered structure 20 is called "form birefringence" since the effective dielectric constant is one value for all polarizations parallel to the layers 82 and 84 and another value for polarizations normal to the layers 82 and 84. The refractive index for polarization along the z-axis is less than the refractive index for polarization along the y-axis.

Figure 7:
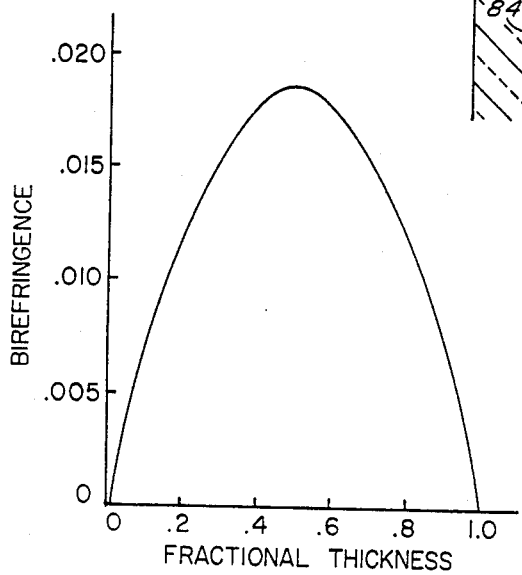
FIG. 7 graphically illustrates the birefringence of a form birefringent stack of layers of materials having differing refractive indices.

FIG. 7 illustrates the difference $\Delta n = n_y - n_z$ of the refractive indices for ordinary and extraordinary waves as a function of the fractional thickness. The graph of FIG. 7 represents the form birefringence obtained when layer 82 is formed of $Al_2O_3$ and layer 84 is formed of $AlF_3$. The materials used in forming the layers 82 and 84 depend upon the core and cladding indices of the fiber 14. A typical core index is about 1.458, and a typical cladding index is about 1.452. The core and cladding indices should be in the range between the refractive indices of the layers 82 and 84. Therefore, for ordinary optical fibers, it has been found that $B_2O_3$, which has a refractive index of about 1.42 is suitable for forming the low index layer and that $GeO_2$ which has a refractive index of 1.59 is suitable for forming the high index layer. If the fiber 14 has sufficiently high core and cladding indices, $SiO_2$, which has a refractive index of 1.453 may be used to form the low index layer.

Unlike the ordinary optical fibers, form birefringent stack 20 will maintain the polarization state of a wave propagating therein. In form birefringent stack 20 the difference between the refractive indices for the two polarizations is sufficiently large that there is a substantial difference between the propagation constants of waves having the two orthogonal polarizations. The difference between the propagation constants eliminates the degeneracy in propagation constants between the polarization states and prevents waves of one polarization from coupling to the other polarization under ordinary conditions. Coupling of energy between waves requires that the waves have essentially the same velocity. If the velocities are different, there is no appreciable coupling between the two states.

Form birefringence begins to be exhibited when the combined thickness of two adjacent layers of stack 20 are equal to or slightly less than the optical wavelength in the layers 82, 84. Thus the threshold of form birefringence is equal to or slightly less than the optical wavelength in the layers 82, 84. Thus the threshold of form birefringence is $$M < \lambda_0/n_z = 8200 \text{ Å}/1.452 = 5623 \text{ Å}. \tag{20}$$

To assure form birefringence, M should be significantly less than the threshold; for example $$M = \lambda_0/8 = 703 \text{ Å} \tag{21}$$

The fractional thicknesses $f_1$ and $f_2$ are determined from the constraint that the birefringence is to be $\Delta n = 0.004$. The actual thickness of the layers 82 and 84 are determined from the fractional thicknesses and the constraint that the combined thicknesses will be a selected fraction, such as one eighth, of the wavelength of the light being polarized.

The following describes processes for producing form birefringent stack 20 to meet the requirements of presenting an asymmetrical refractive index distribution to parallel polarizations and a symmetrical refractive index distribution to perpendicular polarizations.

A low viscosity liquid glass, commonly known as sol-gel, may be formed to include $B_2O_3$. A drop of the sol-gel is placed on a substrate and then spun at an angular velocity sufficient to form a thin liquid layer. The liquid is dried, preferably by heating, to form a layer of $B_2O_3$. A second sol-gel is formed to include $GeO_2$, and the steps described above are repeated to form a layer of $GeO_2$ on the $B_2O_3$ layer. Alternating layers of the two materials are formed until the total number desired are formed.

The $GeO_2$ and $B_2O_3$ layers may be formed in a straight forward manner well-known in the art by alternately sputtering $GeO_2$ and $B_2O_3$ films onto a substrate. The $GeO_2$ layer may also be formed by coating the substrate with a layer of Ge and oxidizing it to $GeO_2$ in a tube furnace in a maner well-known in the art.

If the core and cladding indices permit the use of silicon dioxide, well established optical fabrication techniques can be used to fabricate $SiO_2$ plates from pure bulk $SiO_2$.

For certain core and cladding index profiles, it may be possible to form the form birefringent stack 20 from alternating layers of calcium fluoride, $CaF_2$ and silicon oxide, SiO. $CaF_2$ has an index of rerfraction $n_1 = 1.43$, and SiO has an index $n_2 = 1.70$. With the $CaF_2$ having a thickness $t_1 = 632$ Å and the SiO having a thickness $t_2 = 74$ Å, the resulting stack has refractive indices $n_z = 1.4525$ and $n_y = 1.4607$. Both the $CaF_2$ and the SiO layers may be formed by sputtering techniques well known in the art.

It may be necessary to test the stack 20 to ascertain that the refractive indices of the composite are appropriate for practicing the present invention. One method, well-known in the optics arts for measuring refractive index uses an ellipsometer. The technique basically involves applying a light beam of known direction and polarization to the stack 20, and measuring the polarizations and angles of the reflected and refracted beams.

What is claimed is:

1. A polarizer for propagating an optical signal of a selected polarization in an optical fiber having a central core and a cladding surrounding the central core and for radiating optical signals of other polarizations from the optical fiber, comprising:
    an interaction region formed in a length of said optical fiber, said interaction region comprising a region of said optical fiber from which portions of the cladding and core have been removed; and
    interaction means comprising alternating layers of at least a pair of isotropic materials for forming an asymmetrical refractive index distribution in said core at said interaction region for waves having a first polarization such that waves of said first polarization radiate from said optical fiber and for forming a symmetrical refractive index distribution in said interaction region for waves of a second polarization such that waves of said second polarization are guided in said fiber through said interaction region.

2. The polarizer of claim 1 wherein said length of optical fiber includes a convex portion and said interaction region comprises a flattened region on said convex portion.

3. The polarizer of claim 2 wherein said interaction region comprises:
    a planar core portion of said optical fiber having no cladding thereon; and
    a planar cladding portion surrounding said planar core portion.

4. The polarizer of claim 3 wherein said interaction means comprises a first set of alternating layers of a pair of isotropic materials having first and second refractive indices arranged to comprise a form birefringent stack adjacent said planar core portion.

5. The polarizer of claim 4 wherein said stack of form birefringent material has a first refractive index that is essentially the same as the refractive index of said core and a second refractive index that is essentially the same as the refractive index of said cladding.

6. The polarizer of claim 4 wherein said form birefringent stack has a first refractive index that is essentially the same as the refractive index of said core for polarizations perpendicular to the interaction region and a second refractive index that is essentially the same as the refractive index of said cladding for polarizations parallel to said interaction region.

7. A polarizer of claim 2, further including a substrate having a curved groove therein, said optical fiber being mounted in said curved groove, said flattened region of said optical fiber being coplanar with a surface of said substrate.

8. The polarizer of claim 1 wherein said interaction means comprises alternating layers of two materials having different refractive indices.

9. The polarizer of claim 8 wherein said two materials comprise $B_2O_3$ and $GeO_2$.

10. The polarizer of claim 8 wherein said two materials comprise $SiO_2$ and $GeO_2$.

11. The polarizer of claim 1 further including:
    means for forming an error signal in response to light radiated from said optical fiber; and
    means responsive to the error signal for adjusting the polarization of light input to said interaction region.

12. The polarizer of claim 11 wherein said means for forming an error signal includes at least one photodetector for producing an electrical signal indicative of the intensity of light emitted from said optical fiber.

13. The polarizer of claim 11 wherein said means for forming an error signal includes:
    a first photodetector responsive to the intensity of light emitted from said optical fiber in a first direction; and
    a second photodetector responsive to the intensity of light emitted from said optical fiber in a second direction.

14. The polarizer of claim 11 wherein said means for adjusting the polarization of light input to the interaction region includes means for controlling the refractive indices of a length of said optical fiber.

15. The polarizer of claim 14 wherein said means for controlling the refractive indices of a length of said optical fiber includes means for compressing said optical fiber to produce stress-induced birefringence.

16. The polarizer of claim 15 wherein said means for compressing said optical fiber includes a plurality of fiber squeezers.

17. A method for polarizing light propagating in an optical fiber having a central core and a cladding surrounding the core, comprising the steps of:
forming an interaction region in a length of said optical fiber by removing a portion of the cladding and a portion of the core therefrom;
forming an asymmetrical refractive index distribution for optical waves having a first polarization such that said waves having said first polarization are radiated from said optical fiber at said interaction region;
forming a symmetrical refractive index distribution for optical waves having a second polarization such that said waves having said second polarization are guided in said optical fiber through said interaction region; and
placing a stack of alternating layers of isotropic material adjacent said interaction region to form said asymmetric and symmetric refractive index distributions.

18. The method of claim 17, further including the step of forming the interaction region at a flattened region on a convexly curved portion of said optical fiber.

19. The method of claim 18, wherein the step of forming said interaction region comprises the step of removing material from said optical fiber to form a planar core portion having no cladding thereon.

20. The method of claim 19, further including the step of placing an interaction material adjacent a part of said planar core portion.

21. The method of claim 20, further including the step of forming said interaction material of alternating layers of materials having different refractive indices.

22. The method of claim 21 wherein one of said layers comprises $SiO_2$ and the other layer comprises $GeO_2$.

23. The method of claim 21 wherein one of said layers comprises $B_2O_3$ and the other layer comprises $GeO_2$.

24. The method of claim 18, further including the steps of:
forming a curved groove in a substrate;
mounting said optical fiber in said curved groove; and
forming said flattened region of said optical fiber to be coplanar with a surface of said substrate.

25. The method of claim 17, further including the steps of:
forming an error signal in response to light radiated from said optical fiber; and
adjusting the polarization of light input to said interaction region in response to the error signal.

26. The method of claim 25, further including the step of placing at least one photodetectoer in the optical path of light emitted from said optical fiber at said interaction region for producing an electrical signal indicative of the intensity of light emitted from said optical fiber.

27. The method of claim 25, further including the steps of:
detecting the intensity of light emitted from said optical fiber in a first direction; and
detecting the intensity of light emitted from said optical fiber in a second direction.

28. The method of claim 25 wherein the step of adjusting the polarization of light input to the interaction region includes controlling the refractive indices of a length of said optical fiber.

29. The method of claim 28 wherein the step of controlling the refractive indices of a length of said optical fiber includes compressing said optical fiber to produce stress-induced birefringence.

30. The method of claim 29 wherein the step of compressing said optical fiber includes squeezing the optical fiber with a plurality of fiber squeezers.

31. The method of claim 30 including the steps of:
aligning a first fiber squeezer and a second fiber squeezer to apply parallel stresses to said optical fiber;
placing a third fiber squeezer between the first and second fiber squeezers; and
aligning the third fiber squeezer to apply a stress to the optical fiber that is perpendicular to the optical fiber and at an angle of 45 degrees to the stresses from the first and second fiber squeezers.

32. A method for fabricating a polarizer for polarizing light propagating in an optical fiber having a central core and a cladding surrounding the core, comprising the steps of:
removing the cladding and a portion of the core of said length of optical fiber to form an interaction region in said optical fiber; and
placing a birefringent body formed of layers of isotropic material adjacent said interaction region to provide an asymmetrical refractive index distribution for a first polarization and a symmetrical refractive index distribution for a second polarization.

33. A method for polarizing light propagating in an optical fiber having a central core and a cladding surrounding the core, the cladding having a cladding refractive index and the core having a core refractive index, comprising the steps of:
removing a cladding portion and a core portion from a length of the optical fiber to form an interaction region;
replacing the core portion with a form birefringent stack having a pair of polarization-dependent refractive indices such that the core at the interaction region has an effective diameter less than the cutoff diameter required to guide waves of a first polarization in the optical fiber while having an effective diameter at least as large as the cutoff diameter required to guide waves of a second polarization.

34. The method of claim 33 including the step of forming the form birefringent stack to have a first refractive index substantially equal to the cladding refractive index for optical waves of the first polarization and a second refractive index substantially equal to the core refractive index for optical waves of a second polarization in the optical fiber such that waves having the first polarization are radiated from said optical fiber at said interaction region and optical waves having the second polarization are guided in said optical fiber through said interaction region.

35. Apparatus for polarizing light propagating in an optical fiber having a central core and a cladding surrounding the core, the cladding having a cladding refractive index and the core having a core refractive index, comprising:

a length of the optical fiber from which a cladding portion and a core portion have been removed to form an interaction region;

a form birefringent stack placed adjacent the fiber core at the interaction region to replace the core portion, the form birefringent stack having a pair of polarization-dependent refractive indices such that the core at the interaction region has an effective diameter less than the cutoff diameter required to guide waves of a first polarization in the optical fiber while having an effective diameter at least as large as the cutoff diameter required to guide waves of a second polarization.

36. The apparatus of claim 35 wherein the form birefringent stack has a first refractive index substantially equal to the cladding refractive index for optical waves of the first polarization and a second refractive index substantially equal to the core refractive index for optical waves of a second polarization in the optical fiber such that waves having the first polarization are radiated from said optical fiber at said interaction region and optical waves having the second polarization are guided in said optical fiber through said interaction region.

37. A method for fabricating a polarizer for polarizing light propagating in an optical fiber having a central core and a cladding surrounding the core, the cladding having a cladding refractive index and the core having a core refractive index, comprising the steps of:

removing a cladding portion and a core portion from a length of the optical fiber to form an interaction region;

replacing the core portion with a form birefringent stack having a pair of polarization-dependent refractive indices such that the core at the interaction region has an effective diameter less than the cutoff diameter required to guide waves of a first polarization in the optical fiber while having an effective diameter at least as the cutoff diameter required to guide waves of a second polarization.

38. The method of claim 37 including the step of forming the form birefringent stack to have a first refractive index substantially equal to the cladding refractive index for optical waves of the first polarization and a second refractive index substantially equal to the core refractive index for optical waves of a second polarization in the optical fiber such that waves having the first polarization are radiated from said optical fiber at said interaction region and optical waves having the second polarization are guided in said optical fiber through said interaction region.

* * * * *